(No Model.) 4 Sheets—Sheet 3.

N. H. THOMPSON & H. C. SWAN.
GAS MOTOR ENGINE.

No. 300,661. Patented June 17, 1884.

WITNESSES
N. E. Bowen
Geo. H. Harvey

INVENTORS
N. H. Thompson
Henry C. Swan (No Model.) 4 Sheets—Sheet 4.

N. H. THOMPSON & H. C. SWAN.
GAS MOTOR ENGINE.

No. 300,661. Patented June 17, 1884.

WITNESSES
W. E. Bowen
Geo. H. Harvey

INVENTORS
N. H. Thompson
Henry C. Swan

UNITED STATES PATENT OFFICE.

NILES HIBBARD THOMPSON AND HENRY C. SWAN, OF WASHINGTON, DISTRICT OF COLUMBIA; SAID SWAN ASSIGNOR TO SAID THOMPSON.

GAS-MOTOR ENGINE.

SPECIFICATION forming part of Letters Patent No. 300,661, dated June 17, 1884.

Application filed January 8, 1884. (No model.)

*To all whom it may concern:*

Be it known that we, NILES HIBBARD THOMPSON and HENRY C. SWAN, citizens of the United States, residing at Washington, in the District of Columbia, have invented certain new and useful Improvements in Gas-Motor Engines, of which the following is a specification.

Our invention relates to that class of gas-engines which compress a mixture of gas and air into a reservoir, from which it is admitted into one end of the power-cylinder, and there ignited while under compression, the expansion of the ignited gas and air performing work upon the piston during each forward stroke, the return or back stroke being effected by the momentum of the fly-wheel.

The objects of our invention are, first, to improve the construction of the main valves, so as to effect a saving of power in operating them; second, to secure greater uniformity in the speed of the engine; and, third, to more perfectly adapt the power employed to the amount of work being done. The inlet, ignition, and outlet valves are so balanced as not to be subject to lateral pressure, either from the compressed gas and air in the compression-reservoir or from the ignited charges in the power-cylinder. They are therefore operated with very little friction and loss of power. The speed-governor is provided with gear which operates in such a manner that a slight change in the position of the arms of the governor, caused either by an increase or by a diminution in the work of the engine, will restore the speed of the engine to its normal velocity, however great the change in the work may be, if it does not exceed the maximum power of the engine. The mixture of gas and air used to operate the engine is first compressed by a pump, which may be separate from the power-cylinder. We prefer, however, by reason of the greater economy in such construction, to employ one end of the power-cylinder for this purpose, the power-piston serving also as the piston of the pump or compression cylinder. The volume of compressed gas and air which is admitted into the power-cylinder is regulated automatically at every forward stroke, according to the amount of work which the engine is performing at the time. The power developed by the combustion of gas and air is therefore always adapted to the work being done. For the same reason, also, the engine will maintain a very nearly uniform speed, even when the amount of work is greatly varied, and the consumption of gas will never exceed the volume actually required to do the work at the time. The reservoir in which the compressed gas and air are stored is provided with an adjustable pressure-regulator, which operates to maintain a very nearly uniform degree of compression of the charges in the power-cylinder at the time of their ignition, notwithstanding variations in the volume of the charges, which take place by reason of changes in the amount of work being done, and by means of which the degree of such compression may be changed when desired. The ignition of the charges is also regulated automatically, so as to be effected at the proper time and while the charges are under the proper degree of compression, although the time of their ignition sometimes occurs at an earlier and sometimes at a later point in the stroke, according to the volume of gas and air required to perform the work of the engine at different times. The ignition-valve is provided with a small spiral of platinum wire, which is rendered incandescent by the burning gas-jet therein, and serves to relight the said jet whenever it is extinguished by the ignition of the charges. By this means the ignition of the charges is always insured, and the engine never stops or expels gas unconsumed from failure therein.

The following is a description in detail of an engine embodying our improvements.

Figure 1:
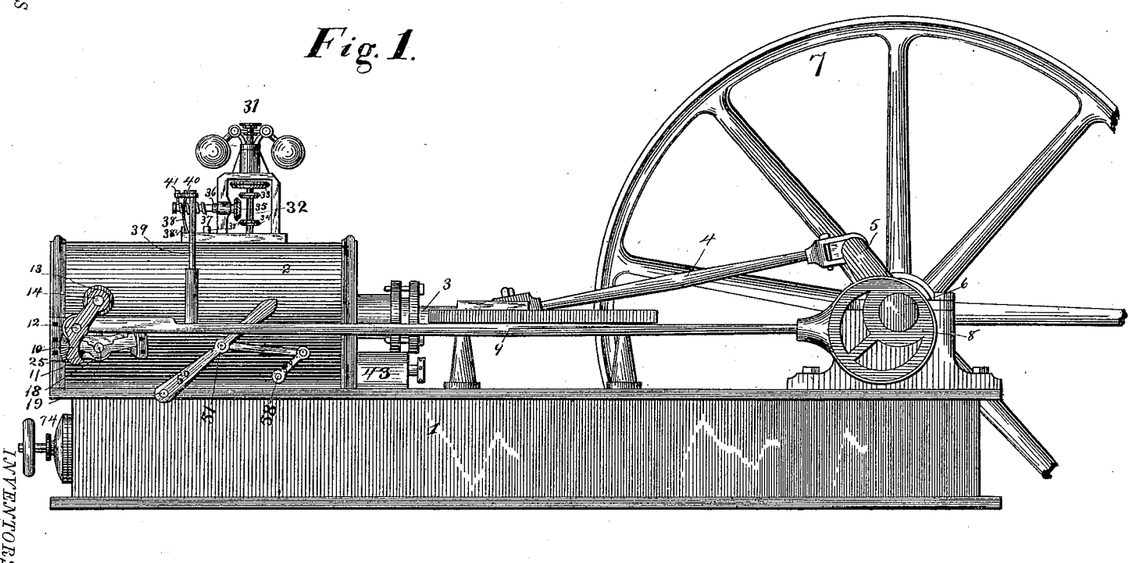
Figure 1 is a side elevation.

In Fig. 1, 1 is the base. 2 is the cylinder. 3 is the piston-rod. 4 is the pitman. 5 is the main crank. 6 is the crank-shaft. 7 is the fly-wheel. 8 is the eccentric. 9 is the eccentric-rod, which is connected with the crank 10 of the outlet-valve 13 of the power-cylinder. The inlet-valve 18 of the power-cylinder is actuated by the graduated cam 11 on the inner face of the said outlet-valve crank by means of the arm 25 on a sleeve which slides on the shaft 19 of the said inlet-valve. 31 is the speed-governor. The beveled friction-wheels 33 and 34 on the stem or rod thereof actuate alternately, when the arms of the said governor rise or fall, the intermediate beveled friction-wheel, 35, on the shaft 36. The spiral thread 37 on the said shaft gears with the pin 41 in the end of the lever 40 of the rocking shaft 39, the other lever, 42, of which gears with the sleeve 24 on the inlet-valve shaft. 43 is the pressure-regulator. 50 is a pivoted lever having a pin, 51, projecting from its face, and connected by a rod to the lever 59 of the rocking shaft 58. These levers are employed to disengage the eccentric-rod from the valves of the power-cylinder, and to open the inlet-valve of the compression-cylinder when stopping the engine. 74 is the stop-cock of the pipe which supplies compressed gas and air to the power-cylinder from the compression-reservoir.

Figures 2, 4:
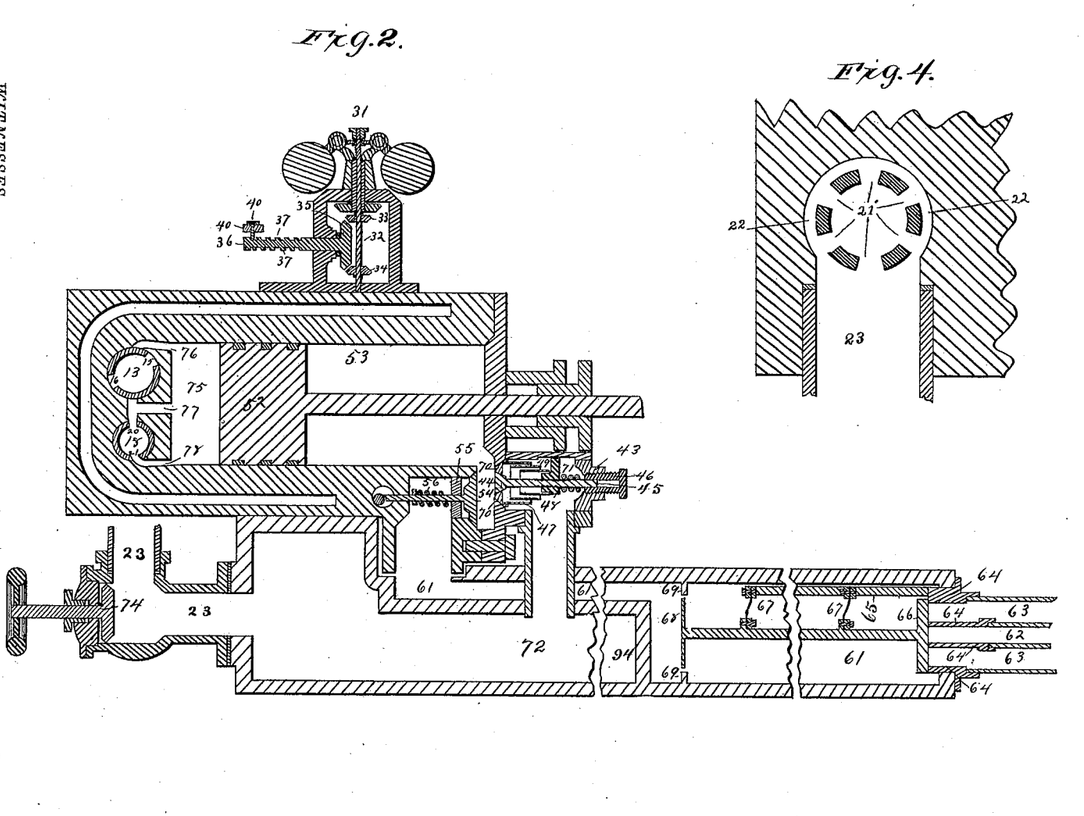
Fig. 2 is a longitudinal section, of the engine.
Fig. 4 is a transverse section of the inlet-valve.

In Fig. 2, 52 is the piston-head. The compression-cylinder 53 is provided with the inlet-valve 54, through which gas and air are drawn from the chamber 61, and the outlet-valve 70, through which the gas and air, when compressed, are forced into the compression-reservoir 72. The power-cylinder 75 is provided with the inlet-valve 18 and the outlet-valve 13. Compressed gas and air are supplied thereto from the compression-reservoir through the ports 77 and 78 therein and the ports 20 and 21 of the inlet-valve, and the products of combustion are expelled therefrom through the ports 76 and 77 therein and the ports 15 and 16 of the outlet-valve. 61 is the gas and air chamber, and 62 and 63 are respectively the gas and air supply pipes thereof, which are attached to the double tube 64. The said tube has a flat face on its inner end, which serves as the seat of the gas and air supply valve 66. The said valve is suspended by thin flat springs 67, which are attached at one end to its stem, and at the other to the rod 65, projecting from the inner end of the double tube 64, and serve as a support and guide to the said valve and to press it lightly against its seat. The said springs are attached transversely to the stem of the said valve, and hold its face true to its seat. The disk 68 on one end of the stem of the said valve moves freely through a circular opening, which is a little larger than the said disk, in the partition 69 of the gas and air chamber. At each back-stroke of the piston, gas and air flow into the compression-cylinder from the gas and air chamber. At the end of each such stroke the said chamber is more or less depleted, and gas and air will continue to flow thereinto from the supply-pipes thereof during a greater or less portion of the forward stroke of the piston, according to the extent of such depletion. During the beginning of each back-stroke the pressure of the gas and air in the said chamber against that face of the disk 68 toward the gas and air supply valve 66 operates to open the said valve at an earlier point in the stroke than it would open without the aid of the said disk. The gas and air will therefore begin to flow into the said chamber sooner, and the depletion thereof will be less. During each forward stroke the volume of gas and air which has entered the compression-cylinder during the preceding back-stroke is compressed, and forced through the outlet-valve thereof into the compression-reservoir 72. At the beginning of each such forward stroke compressed gas and air are admitted into the power-cylinder from the said reservoir, the supply being cut off at an earlier or later point in such stroke, according to the amount of work being done by the engine at the time. At short and regular intervals after the supply is thus cut off, the charge in the power-cylinder is ignited, and the expansion of the ignited charge drives the piston forward. The degree of compression under which the charges are ignited may be regulated by the adjustment of the pressure-regulator 43, the details of which are as follows: The pressure-regulator valve 44 is combined, for convenience, with the outlet-valve 70 of the compression-cylinder. One end of the stem 45 of the pressure-regulator valve has an oblong cross-section, and plays in the neck 46, which serves as a guide to both the said valves. The adjustable spring 47 is held between the said outlet-valve 70 and the adjusting-nut 48, which has a guide, 49, sliding in a groove in one side of the pressure-regulator. This nut fits a screw-thread on the stem 45, which, being turned to the right or the left by means of the neck 46, causes the said nut, which is prevented from turning by the said guide, to diminish or increase the tension of the said spring. So long as the combined pressures of the said spring and of the gas and air in the compression-cylinder exceed the pressure of the gas and air in the compression-reservoir, the escape of gas and air from the said reservoir into the said cylinder is prevented by the said valve 44.

Whenever the latter pressure exceeds the former, the said valve 44 opens and permits the escape of compressed gas and air from the said reservoir back into the said cylinder, until the normal pressure in the said reservoir is restored. The excessive pressure in the said reservoir is always relieved during the back-stroke, and the compressed gas and air escaping into the said cylinder therefore performs work upon the piston, and the power expended in compressing it is restored to the engine. The pressure-regulator valve is shown as placed in one end of the compression-cylinder. It may, however, be placed between the compression-reservoir and the gas and air chamber, as at the point 94, and the excess of compressed gas and air permitted to escape into the said chamber. The capacity of the compression-reservoir is many times greater than the volume of gas and air used for any one charge, and therefore the variation in the volume of the charges, which occurs when the supply is cut off at an earlier and when cut off at a later point in the stroke, causes only a small variation in the degree of compression under which they are ignited. Should such degree of compression, however, be greater or less at any time than desired, it may be readily increased or diminished by adjusting the pressure-regulator. By the operation of the pressure-regulator the degree of compression of the gas and air in the said reservoir may be steadily maintained at a predetermined maximum, and such maximum may be changed when desired.

Figures 3, 7:
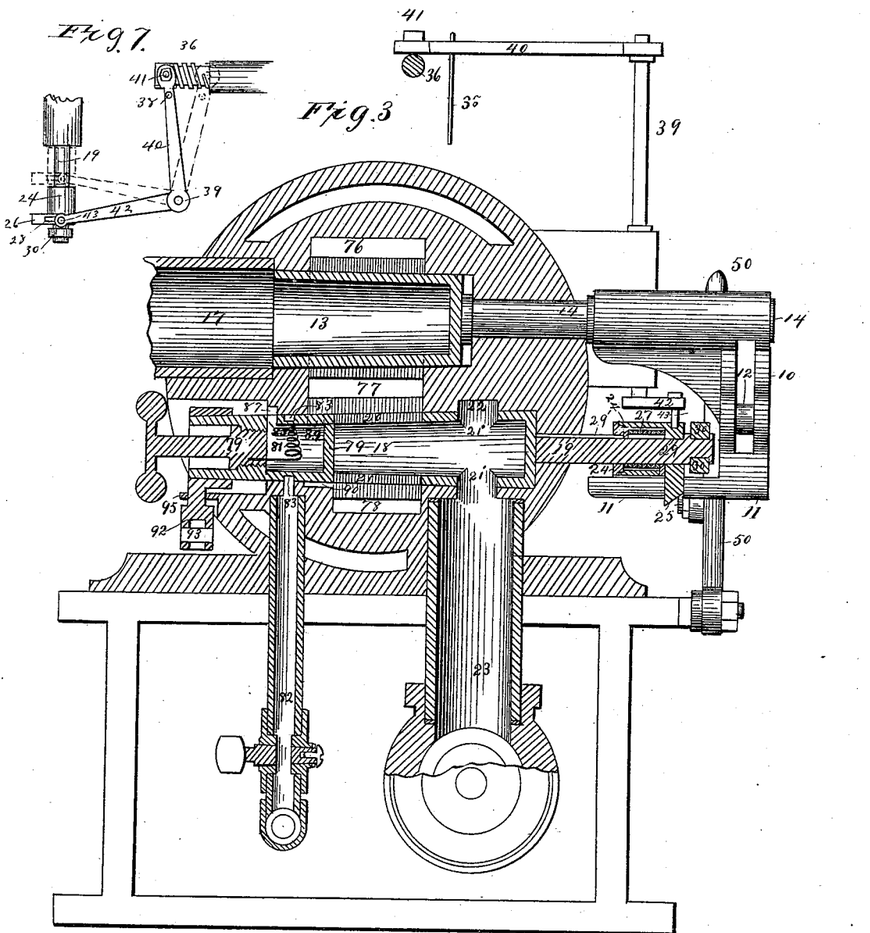
Fig. 3 is a longitudinal section of the ignition, inlet, and outlet valves, with their connections, and a rear end view of some other parts.
Fig. 7 is a plan of the rocking shaft and levers operating the movable sleeve.

In Fig. 3, 18 is the inlet-valve of the power-cylinder; 20 and 21, its ports; 19, its shaft; 23, the supply-pipe leading from the compression-reservoir, and 22 a groove or channel around the said valve, by means of which the gas and air have access to the apertures 21' through the periphery or shell of the said valve. The said apertures are shown in transverse section in Fig. 4. 13 is the outlet-valve of the power-cylinder; 15 and 16, its ports; 14, its shaft; 10, its crank; 12, the crank-pin thereof, to which the eccentric-rod is connected; and 11, the graduated cam which actuates the inlet-valve. 17 is the outlet-pipe of the said valve. The inlet-valve 18 is a hollow slightly-conical tube, closed at both ends. It may, however, be cylindrical. The two ports thereof, 20 and 21, through its periphery, are of equal area, and are placed opposite to each other. The corresponding ports, 77 and 78, of the power-cylinder are also of equal area at the points of their exposure to the said valve, and on opposite sides thereof. The pressures to which the said valve is subjected, both from the ignited charges in the power-cylinder and from the compressed gas and air in the compression-reservoir, are thus respectively equal and opposite, and therefore in equilibrium. The said valve, being thus perfectly balanced, is unaffected by the high pressures to which it is exposed, and very little power is expended in operating it. The outlet-valve 13 and the ignition-valve 79 are constructed in like manner, except that, not being subjected to much internal pressure, the former is closed at one end only, and the latter has only one port, 89. A recess, 90, of the port 78 equals in area that portion of the opposite port, 77, which is exposed to the ignition-valve. The ports 76 and 77 of the power-cylinder, corresponding to the ports 15 and 16 of the said outlet-valve, are of equal area at the points of their exposure thereto and on opposite sides thereof. The ignition-valve 79 is so actuated as to cause the ignition of the charges in the power-cylinder at short and regular intervals after the supply is cut off. It is formed in the same block or piece of metal with the inlet-valve 18, and they are both operated by the same gear. They may, however, be constructed separate from each other and operated by separate gear, the arm 26 of the sleeve 24 not being used with the inlet-valve gear. 82 is the pipe supplying the ignition-valve with compressed gas and air from the compression-reservoir. A groove or channel, 83, cut in the periphery of the said valve on its exterior surface, establishes communication between the supply-pipe 82 and a small hole which pierces the shell of the said valve, called the "gas-burner," 80.

Figure 5:
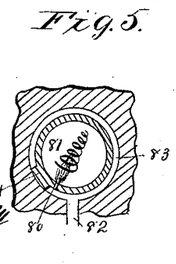
Figs. 5 and 6 are transverse sections of the ignition-valve respectively through the gas-burner and the apertures providing a vent for the gas-jet.
Figure 6:
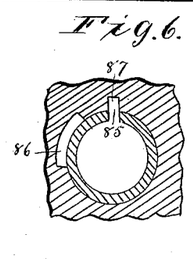

A transverse section of the said valve through the said channel and the said gas-burner is shown in Fig. 5. The said channel extends nearly around the said valve, and communication between the said supply-pipe and the said gas-burner is established at all times, except when the port 89 of the said valve is open. When the said port is open, that portion, 84, of the said valve which is not cut by the said channel closes the mouth of the said supply-pipe. Enough compressed gas and air, however, to supply the said gas-burner until communication is re-established remains in the said channel when the supply is cut off. A small spiral of platinum wire, 81, or other refractory material, is placed in front of the gas-burner, and is rendered incandescent by the burning gas-jet. Whenever the gas-jet is extinguished by the ignited charge, it is relighted by the incandescent platinum. Should the gas-jet be extinguished at the time of its exposure to a charge, the incandescent platinum will serve to effect the ignition. By reason of the expansion of the charge after the supply is cut off, due to the forward movement of the piston, the degree of compression of the gas and air supplied to the burning jet is higher than that of the charge at the time the port of the ignition-valve is opened. The gas and air supplied to the burning jet therefore continues to flow out when the said port is opened, and ignites the charge. An aperture, 85, in the said valve establishes communication, through the apertures 86 and 87 alternately, between the interior of the said valve and the external atmosphere. Such communication is interrupted only when the port of the said valve is open, and provides a vent for the products of combustion of the gas-jet. A transverse section of the said valve through the said apertures is shown in Fig. 6. The aperture 87 may be dispensed with.

Figure 8:
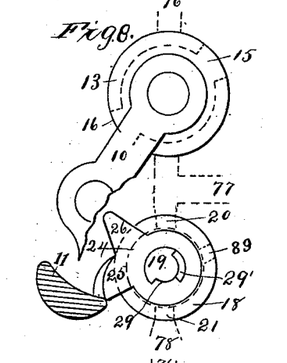
Figs. 8, 9, 10, and 11 are views of the inlet and outlet valves, the graduated cam, (shown in cross-section in three of the figures,) and the movable sleeve, showing their relative positions at different times.
Figure 9:
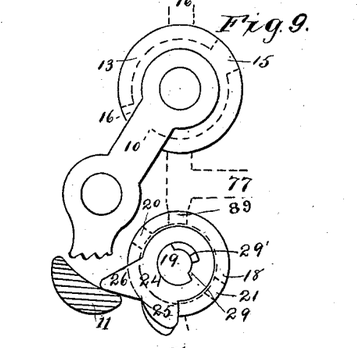
Figure 10:
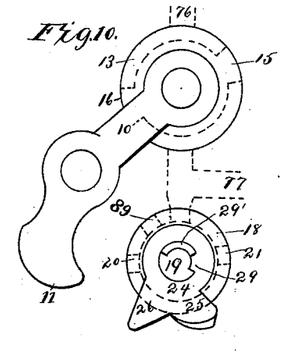
Figure 11:
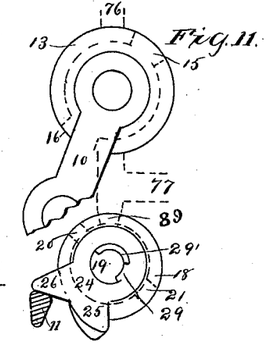
Figure 12:
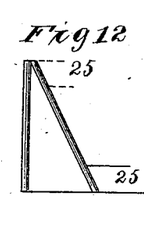
Fig. 12 is a plan of the graduated cam and an arm of the movable sleeve.

The details and automatic action of the variable valve-gear employed to operate the inlet and ignition valves are as follows: The movable sleeve 24 on the shaft 19 of the inlet-valve 18 has a tongue, 29, which slides in a groove, 29', in the said shaft. The said groove is wider than the said tongue, (see Figs. 8, 9, 10, and 11,) and permits the said sleeve to rotate about ninety degrees without rotating the said shaft. A spiral spring, 27, within the said sleeve and around the said shaft is keyed at one end to the former and at the other end to the latter. The tension of the said spring holds the said sleeve, when free, in a position which causes it, when actuated by the forward movement (from right to left) of the graduated cam 11, to rotate the inlet and ignition valves. The said sleeve is moved along the shaft of the said inlet-valve by the action of the speed-governor, which controls the rocking shaft 39, having the levers 40 and 42. A pin, 43, in the end of the latter lever projects into the channel 28 in the said sleeve, (see Figs. 7 and 13,) and any movement of the said lever moves the said sleeve along the shaft of the said inlet-valve. The position of the said sleeve on the said shaft determines at what point in the stroke the supply is cut off and the charge ignited. A plan of the said rocking shaft and levers and of the said sleeve is shown in Fig. 7. The parts are shown therein at one extreme of their movement by unbroken lines, and at the other extreme by dotted lines. The ports of the outlet-valve 13 remain open during the entire back-stroke, at the end of which they close and those of the inlet-valve 18 open. The said ports are so placed that the former close and the latter open a little before the eccentric has reached the middle of its throw, when its motion is rapid. The port 20 of the inlet-valve may be so placed as to open a little before the ports of the outlet-valve close, so as to entirely expel the products of combustion from the power-cylinder. During the forward movement of the eccentric-rod (from right to left) the graduated cam 11 on the inner face of the end of the outlet-valve crank 10 rotates the said inlet and ignition valves by means of the arm 25 on the said sleeve 24 and opens the ports of the said inlet-valve. A further forward movement of the eccentric-rod causes the said arm to be released from the said cam. It is sometimes released at an earlier and sometimes at a later point in the stroke, according to the position of the said sleeve. If the said sleeve is in the position shown in Figs. 3 and 7, the said arm will be released from the said cam at about one-fifth of the stroke. The positions of the said valves at the time the said arm is so released are shown in Fig. 8. The said arm and the said cam are shown in plan in Fig. 12, the former being shown by unbroken lines in its position when released at about one-fifth of the stroke, and by dotted lines in its position when released at about one twenty-fifth of the stroke. A retractile spring (not shown in the drawings) is attached at one end to the pin 93 in the crank 92 of the ignition-valve, and at the other end to any convenient point on the upper flange of the base, as at a point opposite the rocking shaft 58, Fig. 1. When the said arm is released from the said cam, the said spring rotates the said inlet and ignition valves in the opposite direction until the arm 26 on the said sleeve is arrested by the said cam. The said backward rotation closes the ports of the said inlet-valve and opens the port 89 of the said ignition-valve. The supply of compressed gas and air to the power-cylinder is cut off by the said movement, and the charge which has entered the said cylinder is ignited. The positions of the said valves and their connections at the time of the ignition of the charge at the point in the stroke indicated—namely, one-fifth—are shown in Fig. 9. The said inlet and ignition valves are so arrested for a brief time only, the said arm 26 being released from the said cam by the forward movement of the latter. When the said arm 26 is so released, the said valves are rotated by the said retractile spring back to the position at which their forward movement began, which is shown in Fig. 10. The stop 95, Fig. 3, prevents any further backward rotation of the said valves. If the said sleeve 24 is at the opposite extreme of its sliding movement, the supply will be cut off and the charge ignited at about one twenty-fifth of the stroke. The positions of the said valves and their connections when the supply is cut off and the charge ignited at the point of stroke indicated are shown in Fig. 11. If the said sleeve is at any position intermediate to the two extremes, the supply will be cut off at a relatively intermediate point in the stroke. During the backward movement of the said cam it rotates the said sleeve by means of the said arm 26, without rotating the said inlet and ignition valves. When the said cam has retreated sufficiently, the said arm is released, and the spiral spring 27 within the said sleeve rotates the said sleeve forward to its prior position. By the conjoint action of the variable valve-gear upon the inlet and ignition valves, and of the compression-reservoir provided with the adjustable pressure-regulator, the volume of the charges is varied by cutting off the supply at varying points in the stroke, and such variable charges are ignited at short and regular intervals after the supply is so cut off, without any material variation in the degree of their compression at the time of their ignition, and by means of the said adjustable pressure-regulator the degree of such compression may be changed when desired.

The operation of the friction-wheel gear of the speed-governor is as follows, Figs. 1 and 2: When the arms of the speed-governor 31 rise slightly, by reason of an increase in the speed of the engine, the friction-wheel 33 gears with the intermediate friction-wheel, 35, on the shaft 36 and rotates the spiral thread 37 in a direction which causes the rocking-shaft lever 42 to move the sleeve 24 in the direction from its position as shown in Fig. 7 by unbroken lines toward its position as shown therein by dotted lines. The effect of such movement is to cause the supply to be cut off at an earlier point in the stroke, and to diminish the speed of the engine until such change in the speed causes the arms of the speed-governor to fall sufficiently to disengage the aforesaid friction-wheels. When the arms of the speed-governor fall slightly, by reason of a decrease in the speed of the engine, the friction-wheel 34 gears with the said intermediate friction-wheel and rotates the said spiral thread in the opposite direction. The dependent action of the other parts is also reversed, the supply cut off at a later point in the stroke, and the speed increased until the said friction-wheels are disengaged. When the rocking-shaft lever 40 is moved to either of the extreme positions shown in Fig. 7, by the continued rotation of the said spiral thread in one direction, the pin 41 in the said lever is disengaged from the said spiral thread. The lower end of the spring 38, Fig. 1, is pressed against one or other of the stops 38' at such time, and its tension, reacting against the said lever, presses the pin 41 therein lightly against the end of the said spiral thread, and when the said spiral thread is rotated in the opposite direction, by reason of a change in the speed of the engine, the said spring causes the said pin to re-engage with the said spiral thread. The movement of the said lever, and also of the sleeve 24, is thus limited by the length of the said spiral thread. The said spring may be constructed in any suitable form, and beveled cog-wheels may be used instead of the said friction-wheels.

Figure 13:
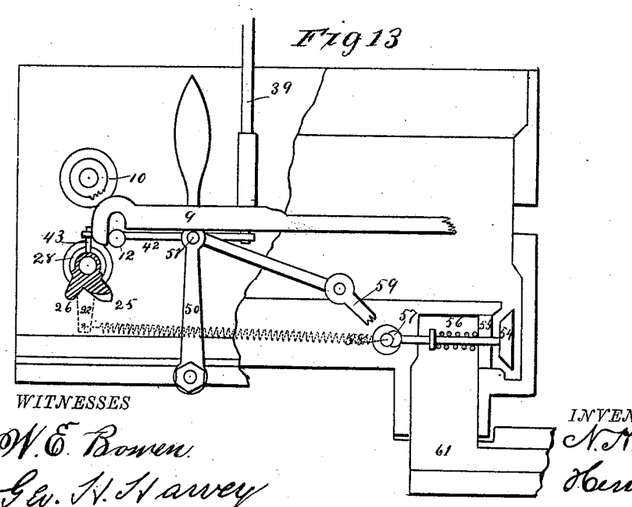
Fig. 13 is a view of a pivoted lever and connections for disengaging the valves of the power-cylinder from the eccentric-rod and opening the inlet-valve of the compression-cylinder.

The action of the pivoted lever 50 and rocking shaft 58 is as follows, Fig. 13: The eccentric-rod 9 engages by a hook with the pin 12 in the outlet-valve crank 10. The said crank is not shown in the figure, and one end of the cylinder is shown in longitudinal section, for the purpose of showing the other parts described. After closing the stop-cock of the supply-pipe of the power-cylinder, the pivoted lever 50 is raised to the position shown in the said figure. Its position during the operation of the engine is shown in Fig. 1. If at the time of raising the said lever the eccentric-rod is in the position shown in Fig. 13, which is the extreme point of its backward movement, it will be disengaged by the pin 51 in the said lever from the outlet-valve crank-pin 12. If the eccentric-rod is in advance of the said position, it will be so disengaged when returning thereto. It will then move freely without operating the valves of the power-cylinder, the ports of the outlet-valve thereof remaining open and those of the inlet and ignition valves remaining closed. A rod connects the said pivoted lever with the lever 59 of the rocking shaft 58, on which there is the cam 57. When the said pivoted lever is raised, as described, the said cam, acting upon the stem of the inlet-valve 54 of the compression-cylinder, opens the said valve. 55 is a guide of the said valve, and 56 is a spiral spring which closes the said valve, when it is not held open by the said cam, at the end of each back-stroke. The action of the said pivoted lever, as described, permits the piston to move freely back and forth, and prevents the reversing of the engine by the rebound of compressed gases in the cylinder.

For convenience, we have shown only one form of variable valve-gear. It is evident, however, that various forms of such gear may be employed to accomplish the results described. Should variable link-motion or shifting-eccentric valve-gear be used, the gas and air should be compressed to a sufficiently higher degree than that at which it is to be ignited to provide for the expansion and fall of pressure of the charges during the longer interval which will occur between the time of cutting off the supply and the ignition of the charges when those forms of variable valve-gear are employed.

We are aware that the charges in gas-engines have been ignited and the supply cut off, first, by causing the expansion of the charges, after they have been ignited, to close a "back-pressure valve" controlling the supply, and, second, by means of an additional cut-off valve operated by an additional eccentric; and that the volume of the charges has been varied and the charges ignited at a fixed point in the stroke, first, by throttling the supply; and, second, by means of variable valve-gear operating the supply-valve only.

We are also aware that an "overflow-valve" has been so arranged as to permit any excess of gas in a gas-reservoir to flow back into the "pump-barrel," for the purpose of "insuring a constant pressure in the gas-reservoir," but not made adjustable for the purpose of changing the degree of compression of the gas and air supply.

We do not claim any of these methods; but,

Having fully described our invention, we claim—

1. Variable ignition-valve gear provided with a movable sleeve having arms or projections thereon, in combination with a graduated cam, from which the said arms are released at varying points in the stroke, according to the position of the said sleeve.

2. In a gas-engine, the combination, with an ignition-valve, of the graduated cam 11 and the movable sleeve 24, having the arms 25 and 26, substantially as and for the purpose specified.

3. The combination of an inlet-valve, an ignition-valve, and variable valve-gear, operating to admit the charges at a fixed point in the stroke, to vary their volume by cutting off the supply at varying points in the stroke, and to cause their ignition at short and regular intervals after the supply is cut off.

4. The combination of an inlet-valve, an ignition-valve, and variable releasing valve-gear, operating to admit the charges at a fixed point in the stroke, to vary their volume by cutting off the supply at varying points in the stroke, and to cause their ignition at short and regular intervals after the supply is cut off.

5. In a gas-engine, the combination, with an inlet and an ignition valve, of the graduated cam 11 and the movable sleeve 24, having the arms 25 and 26, substantially as and for the purpose specified.

6. The combination of an inlet-valve, an ignition-valve, variable valve-gear, an outlet-valve, and an eccentric operating them.

7. The combination of an inlet-valve, an ignition-valve, variable releasing valve-gear, an outlet-valve, and an eccentric operating them.

8. In a gas-engine, the combination, with an inlet and an ignition valve, of the movable sleeve 24, having the arms 25 and 26, an outlet-valve having the crank 10 and cam 11, and an eccentric, substantially as and for the purpose specified.

9. The combination of an inlet-valve, an ignition-valve, variable valve-gear, a compression-reservoir, and a pressure-regulator, operating to admit the charges at a fixed point in the stroke, to vary their volume by cutting off the supply at varying points in the stroke, and to cause their ignition at short and regular intervals after the supply is cut off, without any material variation in the degree of their compression.

10. The combination of an inlet-valve, an ignition-valve, variable releasing valve-gear, a compression-reservoir, and a pressure-regulator, operating to admit the charges at a fixed point in the stroke, to vary their volume by cutting off the supply at varying points in the stroke, and to cause their ignition at short and regular intervals after the supply is cut off, without any material variation in the degree of their compression.

11. In a gas-engine, the combination, with an inlet and an ignition valve, of the graduated cam 11, the movable sleeve 24, having the arms 25 and 26, the compression-reservoir 72, the pressure-regulator valve 44, and the spring 47, substantially as and for the purpose specified.

12. The combination of an inlet-valve, an ignition-valve, variable valve-gear, a compression-reservoir, and an adjustable pressure-regulator, operating to admit the charges at a fixed point in the stroke, to vary their volume by cutting off the supply at varying points in the stroke, and to cause their ignition at short and regular intervals after the supply is cut off, without any material variation in the degree of their compression, and by means of which the degree of their compression at the time of their ignition may be changed when desired.

13. The combination of an inlet-valve, an ignition-valve, variable releasing valve-gear, a compression-reservoir, and an adjustable pressure-regulator, operating to admit the charges at a fixed point in the stroke, to vary their volume by cutting off the supply at varying points in the stroke, and to cause their ignition at short and regular intervals after the supply is cut off, without any material variation in the degree of their compression, and by means of which the degree of their compression at the time of their ignition may be changed when desired.

14. In a gas-engine, the combination, with an inlet and an ignition valve, of the graduated cam 11, the movable sleeve 24, having the arms 25 and 26, the compression-reservoir 72, the pressure-regulator valve 44, and the adjustable spring 47, substantially as and for the purpose specified.

15. The combination of an inlet-valve, variable valve-gear, a compression-reservoir, and an adjustable pressure-regulator, operating to admit the charges at a fixed point in the stroke, and to vary their volume by cutting off the supply at varying points in the stroke, without any material variation in the degree of their compression when cut off, and by means of which the degree of their compression may be changed when desired.

16. The combination of an inlet-valve, variable releasing valve-gear, a compression-reservoir, and an adjustable pressure-regulator, operating to admit the charges at a fixed point in the stroke, and to vary their volume by cutting off the supply at varying points in the stroke, without any material variation in the degree of their compression when cut off, and by means of which the degree of their compression may be changed when desired.

17. In a gas-engine, the combination, with an inlet-valve, of the graduated cam 11, the movable sleeve 24, having the arm 25, the compression-reservoir 72, the pressure-regulator valve 44, and the adjustable spring 47, substantially as and for the purpose specified.

18. The combination of an inlet-valve, variable valve-gear, a compression-reservoir, and a pressure-regulator, operating to admit the charges at a fixed point in the stroke, and to vary their volume by cutting off the supply at varying points in the stroke, without any material variation in the degree of their compression when cut off.

19. The combination of an inlet-valve, variable releasing valve-gear, a compression-reservoir, and a pressure-regulator, operating to admit the charges at a fixed point in the stroke, and to vary their volume by cutting off the supply at varying points in the stroke, without any material variation in the degree of their compression when cut off.

20. In a gas-engine, the combination, with an inlet-valve, of the graduated cam 11, the movable sleeve 24, having the arm 25, the compression-reservoir 72, the pressure-regulator valve 44, and the spring 47, substantially as and for the purpose specified.

21. The combination, with a compression-reservoir, of a pressure-regulator valve controlled by an adjustable spring pressing it against its seat, operating to permit gas and air to escape from the said reservoir into a receptacle provided for the purpose whenever the pressure in the said reservoir exceeds a predetermined maximum, and by means of which said maximum may be changed when desired.

22. The combination, with a compression-cylinder and a compression-reservoir, of an intermediate pressure-regulator valve controlled by an adjustable spring pressing it against its seat, operating to control the escape of gas and air from the said reservoir back into the said cylinder, and by means of which the maximum degree of compression in the said reservoir may be changed when desired.

23. In a gas-engine, the combination, with a compression-cylinder and a compression-reservoir, of the intermediate pressure-regulator valve, 44, and the adjustable spring 47, substantially as and for the purpose specified.

24. The combination of an inlet-valve, an ignition-valve, variable valve-gear, a speed-governor gearing with a shaft having a spiral thread, so as to rotate it either to the right or to the left, when the arms of the speed-governor either rise above or fall below their normal position, and a lever engaging with and disengaging from the said spiral thread and connecting with and controlling the said valve-gear, operating to control the speed of the engine by slight changes in the position of the arms of the speed-governor.

25. In a gas-engine, the combination, with an inlet and an ignition valve, variable valve-gear, and a speed-governor, of the friction-wheels 33, 34, and 35, the shaft 36, having the spiral thread 37, the levers 40 and 42, the spring 38, and the stop 38', substantially as and for the purpose specified.

26. A cylindrical or slightly-conical valve having two inlet or outlet ports of equal area placed opposite each other, in combination with a gas-engine power-cylinder having corresponding inlet or outlet ports, operating to equilibrate the pressure against the valve of the ignited charges.

27. In a gas-engine, the combination, with the power-cylinder 75, having the ports 77 and 78, of the inlet-valve 18, having the ports 20 and 21, substantially as and for the purpose specified.

28. In a gas-engine, the combination, with the power-cylinder 75, having the ports 76 and 77, of the outlet-valve 13, having the ports 15 and 16, substantially as and for the purpose specified.

29. Cylindrical or slightly-conical inlet and outlet valves, each having two ports of equal area placed opposite each other, in combination with a gas-engine power-cylinder having corresponding inlet and outlet ports, operating to equilibrate the pressure of the ignited charges against the said valves.

30. In a gas-engine, the combination, with the power-cylinder 75, having the ports 76, 77, and 78, of the inlet-valve 18, having the ports 20 and 21, and the outlet-valve 13, having the ports 15 and 16, substantially as and for the purpose specified.

31. An ignition-valve provided with a channel or small chamber which communicates with a gas-burner in the said valve at all times, and with a reservoir of compressed gas and air at all times except when the ignition-port of the said valve is open.

32. The combination, with an ignition-valve having therein a gas-burner and provided with a channel or small chamber which communicates with the said burner at all times, and with a reservoir of compressed gas and air at all times except when the ignition-port of the said valve is open, of a piece of platinum or other refractory material, which is rendered incandescent by the jet of the said gas-burner, for the purpose of relighting the jet when it is extinguished.

33. The combination, with a gas-burner in an ignition-valve, the lighted jet of which is exposed for a brief time to the charges, for the purpose of igniting them, and relieved of the products of combustion by the opening of a vent, of a piece of platinum or other refractory material, which is rendered incandescent by the burning jet, for the purpose of relighting the jet when it is extinguished, and a reservoir supplying the gas-burner with compressed gas and air, for the purpose of the more efficiently effecting and maintaining the incandescence of the platinum.

34. The combination, with a gas-burner in an ignition-valve, the lighted jet of which is exposed for a brief time to the charges, for the purpose of igniting them, of a piece of platinum or other refractory material, which is rendered incandescent by the burning jet, for the purpose of relighting the jet when it is extinguished, and a reservoir supplying the gas-burner with compressed gas and air, for the purpose of the more efficiently effecting and maintaining the incandescence of the platinum.

35. An ignition-valve provided with the gas-burner 80, the platinum or other refractory material 81, the channel or small chamber 83, the port 89, and the apertures 85 and 86, substantially as and for the purpose specified.

36. The combination, with the compression-reservoir 72, of an ignition-valve provided with the channel or small chamber 83, the gas-burner 80, the platinum or other refractory material 81, and the port 89, substantially as and for the purpose specified.

37. The combination, with the compression-reservoir 72, of an ignition-valve provided with the gas-burner 80, the platinum or other refractory material 81, the port 89, and the apertures 85 and 86, substantially as and for the purpose specified.

38. The combination, with the compression-reservoir 72, of an ignition-valve provided with the gas-burner 80, the platinum or other refractory material 81, and the port 89, substantially as and for the purpose specified.

39. The combination, with the inlet-valve of the compression-cylinder, of a cam and suitable means for operating the same to open the said valve, for the purpose of preventing the engine from reversing when stopping.

40. In a gas-engine, the combination, with the valve 54, of the rocking shaft 58 and suitable means for operating the same, and the cam 57, substantially as and for the purpose specified.

41. The combination, with the valves of the power-cylinder, of a pivoted lever engaging with the eccentric-rod, and a rocking shaft connecting with the said lever and having a cam for opening the inlet-valve of the compression-cylinder, for the purpose of disengaging the said valves of the power-cylinder from the eccentric-rod, and for preventing the engine from reversing when stopping.

42. In a gas-engine, the combination, with the valves of the power-cylinder, of the eccentric-rod 9, the pivoted lever 50, having the pin or projection 51, the rocking shaft 58, connected with the said lever and having the cam 57, and the valve 54, substantially as and for the purpose specified.

43. The combination, with a gas and air chamber, of a gas and air supply valve provided with springs attached transversely to its stem and to a suitable support, and serving as a guide and support to the said valve, for the purpose of controlling the supply of gas and air to the said chamber.

44. In a gas-engine, the combination, with the gas and air chamber 61, of the gas and air supply valve 66 and the springs 67, having a suitable support, substantially as and for the purpose specified.

45. The combination, with a gas and air chamber, of a gas and air supply valve provided with a suitable support and guide, having a disk attached to its stem, and provided with a surrounding wall, for the purpose of controlling the supply of gas and air to the said chamber.

46. In a gas-engine, the combination, with the gas and air chamber 61, of the gas and air supply valve 66, provided with a suitable support and guide, the disk 68, and the wall or partition 69, substantially as and for the purpose specified.

47. The combination, with a gas and air chamber, of a gas and air supply valve having a disk provided with a surrounding wall, and springs provided with a suitable support and attached transversely to its stem, for the purpose of guiding, supporting, and controlling the said valve.

48. In a gas-engine, the combination, with the gas and air chamber 61, of the gas and air supply valve 66, the springs 67, having a suitable support, the disk 68, and the wall or partition 69, substantially as and for the purpose specified.

NILES HIBBARD THOMPSON.
HENRY C. SWAN.

Witnesses:
MELVILLE THOMPSON,
BENJ. F. FULLER.